United States Patent [19]

Maehara

[11] Patent Number: 5,517,403
[45] Date of Patent: May 14, 1996

[54] INVERTER DEVICE

[75] Inventor: Minoru Maehara, Kadoma, Japan

[73] Assignee: Matsushita Electric Works, Ltd., Osaka, Japan

[21] Appl. No.: 177,963

[22] Filed: Jan. 6, 1994

[30] Foreign Application Priority Data

Feb. 23, 1993 [JP] Japan ................... 5-033771

[51] Int. Cl.[6] ................................ H02M 7/5387
[52] U.S. Cl. ............................... 363/132; 363/47
[58] Field of Search ................... 363/34, 37, 47, 363/48, 131, 132, 135, 136

[56] References Cited

U.S. PATENT DOCUMENTS

| | | | |
|---|---|---|---|
| 5,251,119 | 10/1993 | Maehara | 363/37 |
| 5,274,540 | 12/1993 | Maehara | 363/37 |
| 5,408,403 | 4/1995 | Nerone et al. | 363/37 |
| 5,410,466 | 4/1995 | Maehara | 363/132 X |
| 5,459,651 | 10/1995 | Maehara | 363/34 |

Primary Examiner—Peter S. Wong
Assistant Examiner—Y. Jessica Han

[57] ABSTRACT

An inverter device is connected to output ends of a full-wave rectifier for full-wave rectification of an AC input voltage from an AC power source, and includes an inductance component in a loop formed with a load circuit including an LC resonance series for charging a DC power-source capacitor through one of a pair of switching elements, whereby a high input power factor is maintained while reducing any distortion of input current, and a control of the switching elements which function to restrain any rush current can be simplified.

23 Claims, 12 Drawing Sheets

INVERTER DEVICE

BACKGROUND OF THE INVENTION

This invention relates to an inverter device which converts an AC input voltage from an AC power source into a DC voltage and supplies to a load this DC voltage as converted into a high frequency by an inverter.

DESCRIPTION OF RELATED ART

For the inverter device of this kind, there have been suggested such ones as disclosed in Japanese Patent Laid-Open Publication No. 60-134776, U.S. patent application Ser. No. 798,652 assigned from the same inventors to the same assignee as those of the present invention (corres. to Japanese Patent Laid-Open Publication No. 4-193067), U.S. Pat. No. 5,251,119 (corres. to Japanese Patent Laid-Open Publication No. 4-222468) and so on, and it would be possible to improve the input power factor with a simpler circuit arrangement when technical matters suggested in these known devices would be based, and to restrain any ripple component which has an undesirable influence on operation of the load. However, they still have not been contributive or suggestive enough for providing an arrangement capable of effectively preventing a rush current apt to occur upon connection to the power source.

The inverter device adapted to the prevention of such rush current occurring upon connection of the power source have been described in Japanese Patent Laid-Open Publication No. 5-56659 (laid-open later than the priority date claimed for the present invention and made not known prior to the filing date of the present application), in which an AC input voltage from the AC power source is full-wave rectified by a full-wave rectifier, an inverter connected to output ends of this full-wave rectifier is provided with a load circuit including an LC resonance series, while the device further comprises a DC power-source capacitor for supplying a DC power to the inverter, a charging diode functioning for supplying a charge current to the DC power-source capacitor upon regeneration of power at the inverter, a discharging diode functioning for supplying the DC power from the DC power-source capacitor to the inverter, an impedance capacitor connected between the output ends of the full-wave rectifier and part of the load circuit in the inverter, and a pair of switching elements for controlling charging and discharging time of the DC power-source capacitor.

In the above inverter device, there is constituted a voltage dropping chopper circuit with a loop passing through the full-wave rectifier, one of the switching elements, charging diode, DC power-source capacitor and again the full-wave rectifier, and the rush current can be prevented seemingly, by optimumly controlling the switching elements. In an event where the device is stably operating after a considerable time elapsed from the connection to the power source, the current is made to flow through a loop passing the full-wave rectifier, impedance capacitor, resonating capacitor and inductor forming part of the resonance series, the other one of the switching elements and again the full-wave rectifier, so that the input power factor can be elevated and the distortion of input current can be restrained.

In the foregoing inverter device, however, there has been a problem that, due to that the impedance in the charging path, for example, is small, such complicated control operation or circuit for realizing the operation as a starting of conduction of one of the switching elements from a point close to the zero-cross point of commercial source power voltage, extremely remarkably shortening ON time of one switching element, and so on has been required for restraining the rush current to be sufficiently low.

SUMMARY OF THE INVENTION

A primary object of the present invention is, therefore, to eliminate the foregoing problem, and to provide an inverter device which is capable of maintaining the input power factor to be high while reducing the distortion of input current, and of simplifying the control of switching elements for effectively restraining the rush current upon connection of the power source.

According to the present invention, the above object should be realized by means of an inverter device in which an AC input voltage from an AC power source is full-wave rectified by a full-wave rectifier, an inverter connected to output ends of the full-wave rectifier is provided with a load circuit including an LC resonance series, the inverter being so provided that a DC power is supplied from a DC power-source capacitor to the inverter, while a charge current is caused upon power regeneration of the inverter to flow through a charging diode to the DC power-source capacitor and a DC power is made to flow from the DC power-source capacitor through a discharging diode to the inverter, an impedance element is connected between the output ends of the full-wave rectifier and part of the load circuit of the inverter, and charging and discharging time of the DC power-source capacitor can be controlled by means of a pair of switching elements, wherein an inductance component is provided on a loop for charging the DC power-source capacitor from the AC power source through the full-wave rectifier and one of the switching elements in the inverter.

Other objects and advantages of the present invention shall become clear as description of the invention advances to details with reference to accompanying drawings.

While the present invention is to be described in the followings with reference to the respective embodiments shown in the accompanying drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 1:
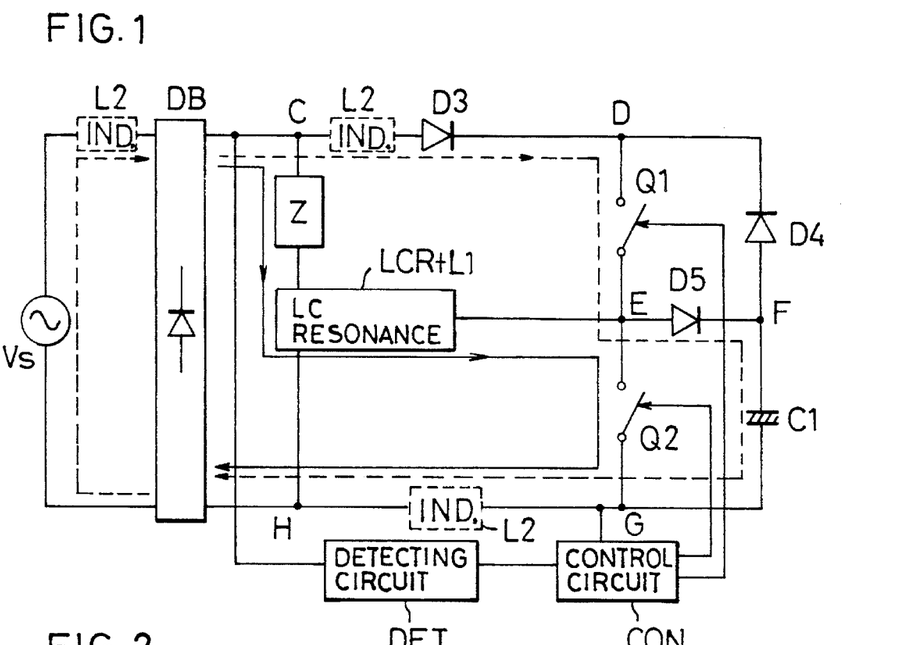
FIG. 1 is a circuit diagram showing a basic concept of the inverter device according to the present invention.

Referring to FIG. 1 of the circuit diagram showing the basic concept of the inverter device according to the present invention, a full-wave rectifier DB is connected to an AC power source Vs, and an inverter is connected to output ends of this full-wave rectifier DB. The inverter includes a series circuit of an LC resonance circuit LCR as an LC resonance series and an inductance L1, and an impedance Z is connected between the full-wave rectifier DB and the LC resonance series while a diode D3 is connected in parallel relationship to the resonance series. To the full-wave rectifier DB, further, a pair of switching elements Q1 and Q2 are connected through the diode D3 while a connecting point E between these switching elements Q1 and Q2 is connected to the LC resonance series, and a discharging diode D4 and DC power-source capacitor C1 are connected in parallel relationship to the pair of the switching elements Q1 and Q2. A charging diode D5 is connected between the connecting point E of the pair of switching elements Q1 and Q2 and a connecting point F of the discharging diode D4 to the DC power-source capacitor C1. Between positive and negative output lines of the full-wave rectifier DB, further, a detecting circuit DET and a control circuit CON are connected.

In addition, in the present instance, there is connected an inductance component L2 in a loop shown by a dotted line in FIG. 1 for charging the DC power-source capacitor C1 from the AC power source Vs through the full-wave rectifier DB and one switching element Q1. In practice, this inductance component L2 is inserted properly selectively between the AC power source Vs and one input end of the full-wave rectifier DB, between the positive side output end of the rectifier DB and the diode D3, or between the other switching element Q2 and the negative side output end of the rectifier DB.

According to the present invention, the insertion of the inductance component L2 in the charging loop for the DC power-source capacitor C1 formed from the AC power source Vs through the full-wave rectifier DB to the capacitor is effective to constitute a voltage dropping chopper in the loop, and a control of one switching element Q1 for restraining the rush current upon connection of the power source can be simplified to a remarkable extent.

Figure 2:
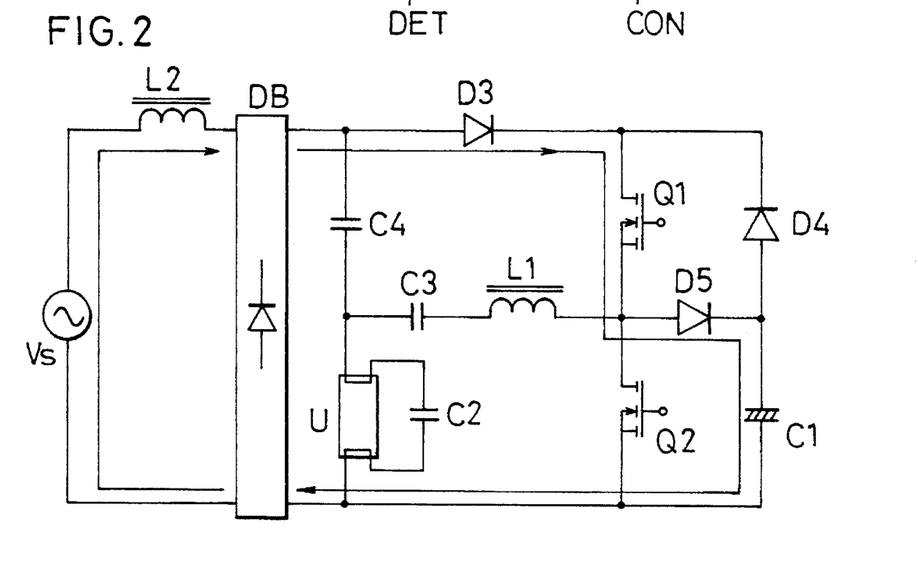
FIG. 2 is a circuit diagram showing an embodiment of the inverter device according to the present invention.

In FIG. 2, there is shown a practical embodiment of the inverter device according to the present invention, in which an inductor is inserted as the inductance component L2 in an AC loop between the AC power source Vs and the full-wave rectifier DB. In this embodiment, the charging loop for the DC power-source capacitor C1 upon turning ON of one switching element Q1 is formed, as shown by a solid line in FIG. 2, through a path from the positive side output end of the full-wave rectifier DB, diode D3, one switching element Q1, charging diode D5, DC power-source capacitor C1 and to the negative side output end of the rectifier DB, and the voltage dropping chopper is thereby constituted. Here, the control of one switching element Q1 can only be attained simply as turned ON and OFF at a high frequency, and there is required no specific operation.

Figure 3:
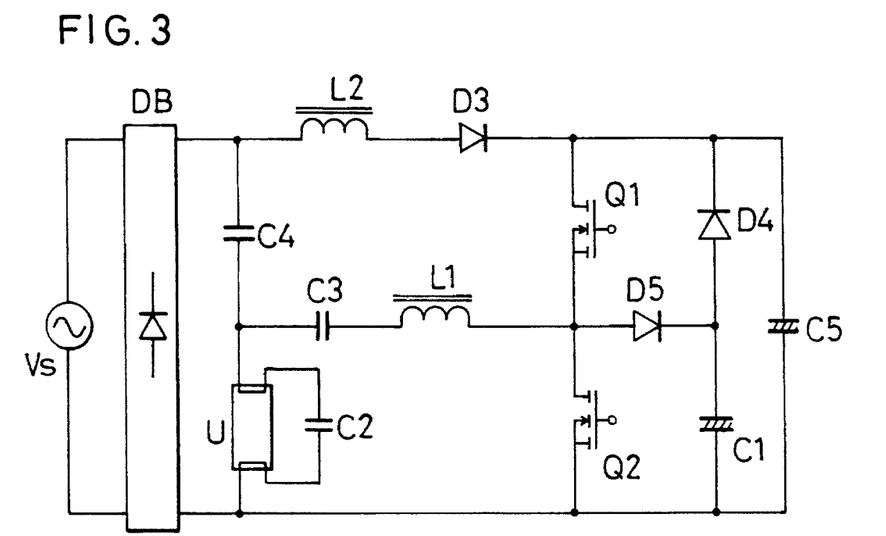
FIGS. 3 and 4 are circuit diagrams showing respectively another embodiments of the inverter device according to the present invention.

In FIG. 3, another embodiment of the inverter device according to the present invention, in which the inductor L2 as the inductance component is inserted between the positive side output end of the full-wave rectifier DB and the diode D3. In this arrangement, too, the voltage dropping chopper is formed in the charging loop for the DC power-source capacitor C1, substantially in the same manner as in the embodiment of FIG. 2. In this embodiment of FIG. 3, it is preferable to connect a further capacitor C5 with respect to the discharging diode D4 and the DC power-source capacitor C1. With the provision of the further capacitor C5, further, it is made possible to have the energy of the inductor L2 discharged through the voltage dropping diode D3 to the capacitor C5, and a stable operation can be obtained.

Figure 4:
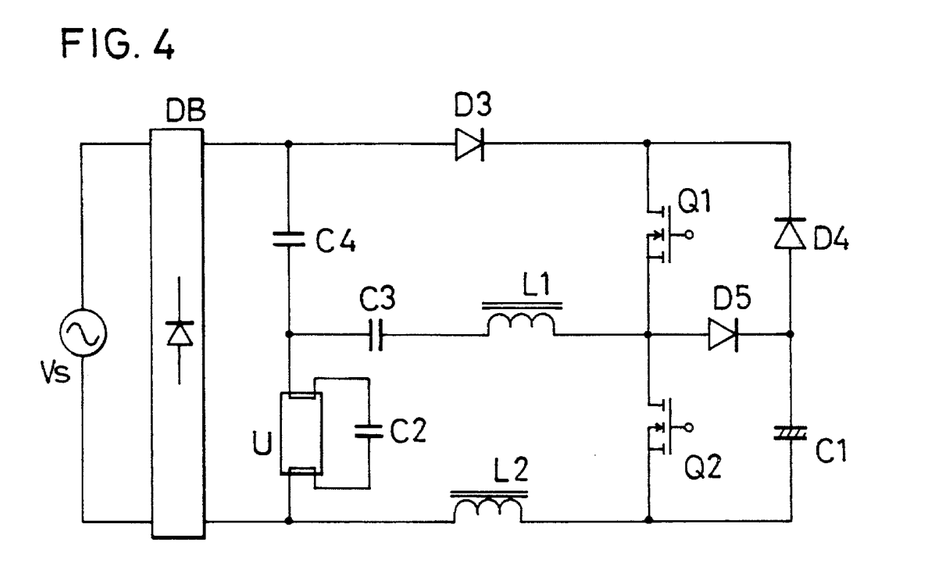
Figure 5:
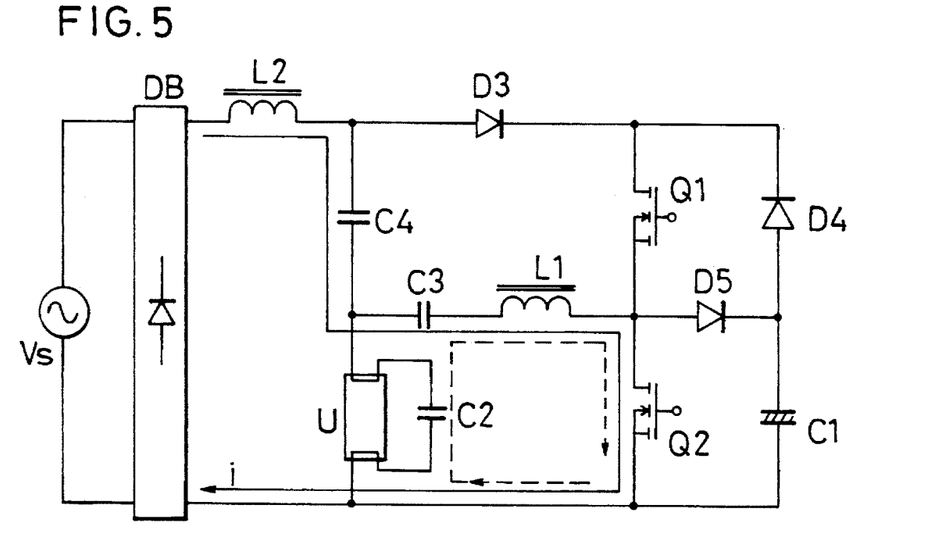
FIGS. 5 and 6 are circuit diagrams of the inverter device the operation of which is to be compared with that of the present invention.
Figure 6:
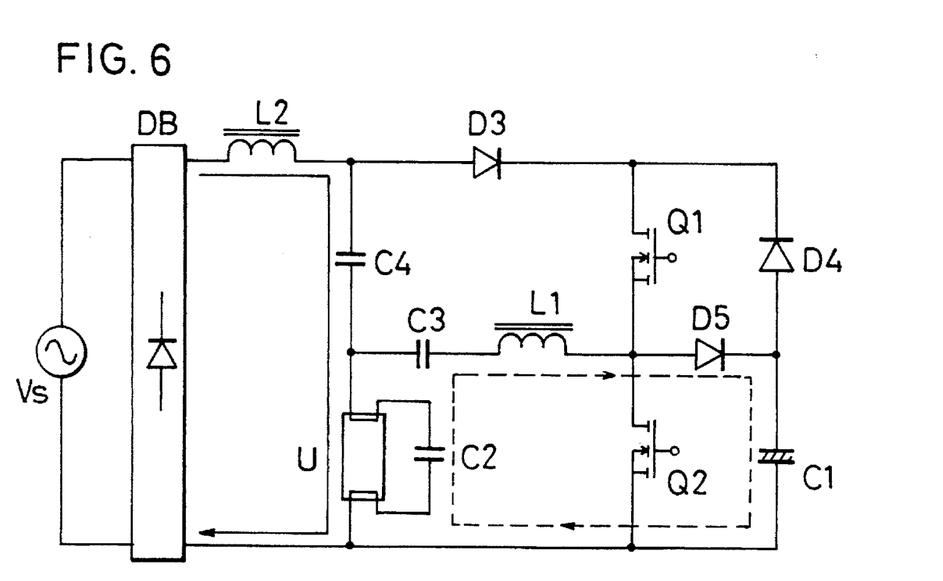

In FIG. 4, another embodiment of the inverter device according to the present invention is shown, in which the inductor L2 as the inductance component is disposed between the other switching element Q2 and the negative side output end of the full-wave rectifier DB, whereby the voltage dropping chopper is formed in the charging loop for the DC power-source capacitor C1 also in the present instance substantially in the same manner as in the embodiment of FIG. 2, and the control of the one switching element Q1 in particular can be simplified to a remarkable extent. In the foregoing embodiments of FIGS. 2 and 3, on the other hand, there is a potential risk that a load current Ia is rendered to be asymmetric between positive and negative sides in a partial period of the commercial source power cycle so as to cause the distortion to readily occur to result in noise generation, and that, when the load U is a discharge lamp in particular, the luminous efficiency of the lamp is deteriorated. More specifically, in an event where the DC power-source capacitor C1 in stationary state has a voltage Vdc which is substantially equal to a peak value of the input voltage Vin from the commercial AC power source Vs, and when the other Q2 of the pair of switching elements is in ON state in such inverter device of a prior invention as in FIG. 5, an input current i from the commercial power source Vs flows through such path as shown by a solid line in FIG. 5 from the full-wave rectifier DB through inductor L2, impedance capacitor C4, resonating capacitor C3 of the LC resonance circuit LCR, inductor L1, the other switching element Q2 and back to the full-wave rectifier DB. In the case when both of the switching elements Q1 and Q2 are in OFF state, the input current i from the commercial power source Vs flows through such path as shown in FIG. 6 by a solid line from the full-wave rectifier DB, inductor L2, impedance capacitor C4, load U and resonating capacitor C2 and back to the rectifier DB. At the same time, an inverter current flows through such path as shown by a dotted line also in FIG. 6, from the inductor C1, charging diode D5, DC power-source capacitor C1, load U as well as resonating capacitor C2, resonating capacitor C3 and back to the inductor L1. In this operation of FIG. 6, an energy accumulated in the inductor L2 is discharged so that a current will be caused to flow through such load U as the discharge lamp so as to cancel the current to the load U by means of the inverter, whereby the current in this direction, that is, the lamp current is rendered to be smaller to become asymmetrical between the positive and negative sides, and eventually the luminous efficiency is deteriorated as has been described. Also in the embodiments of FIGS. 2 and 3, the asymmetrical load current Ia is apt to occur, and there remains the risk that the luminous efficiency is deteriorated.

Figure 7:
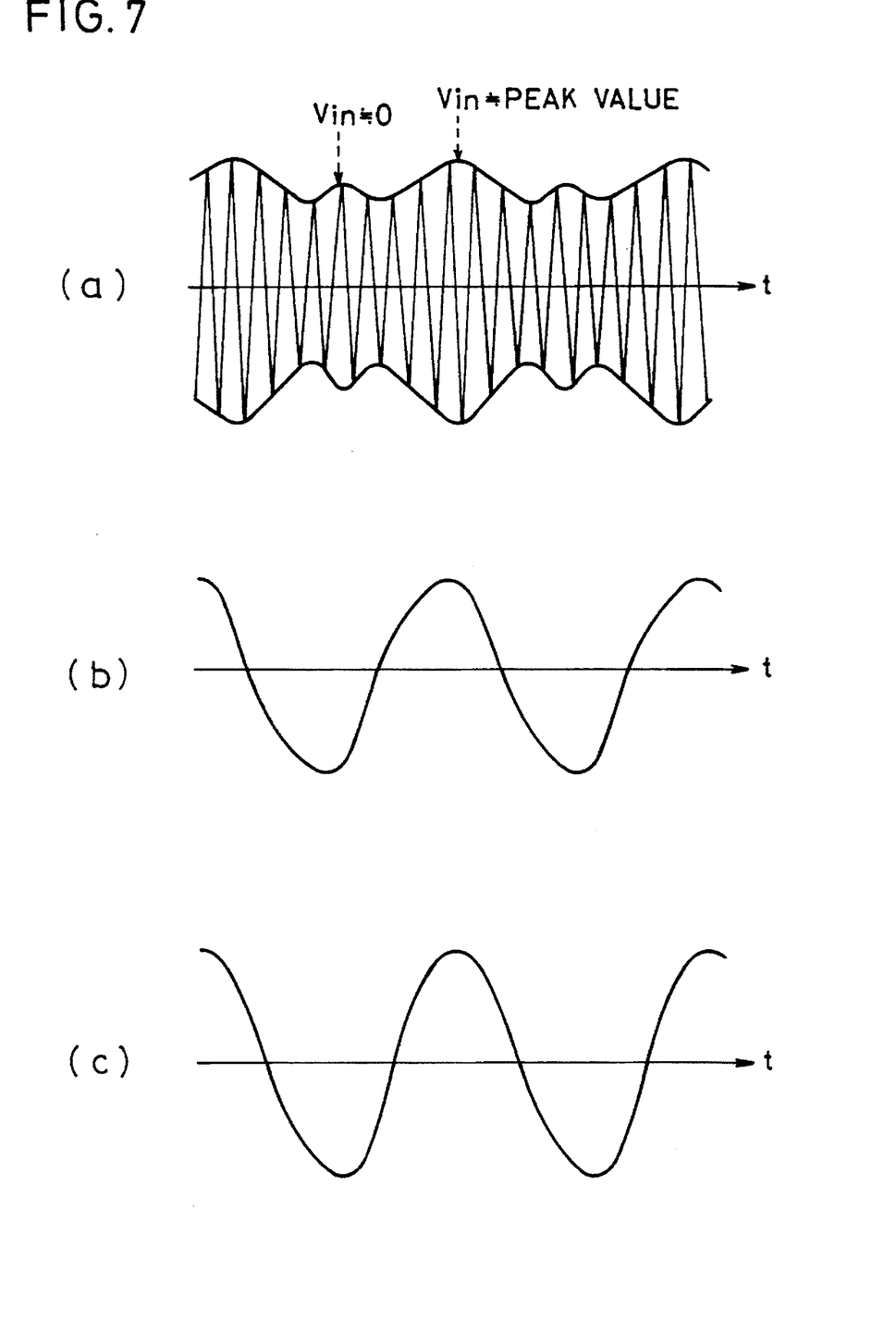
FIGS. 7(a) to 7(c) are waveform diagrams showing load currents in the device of FIG. 4.
Figure 8:
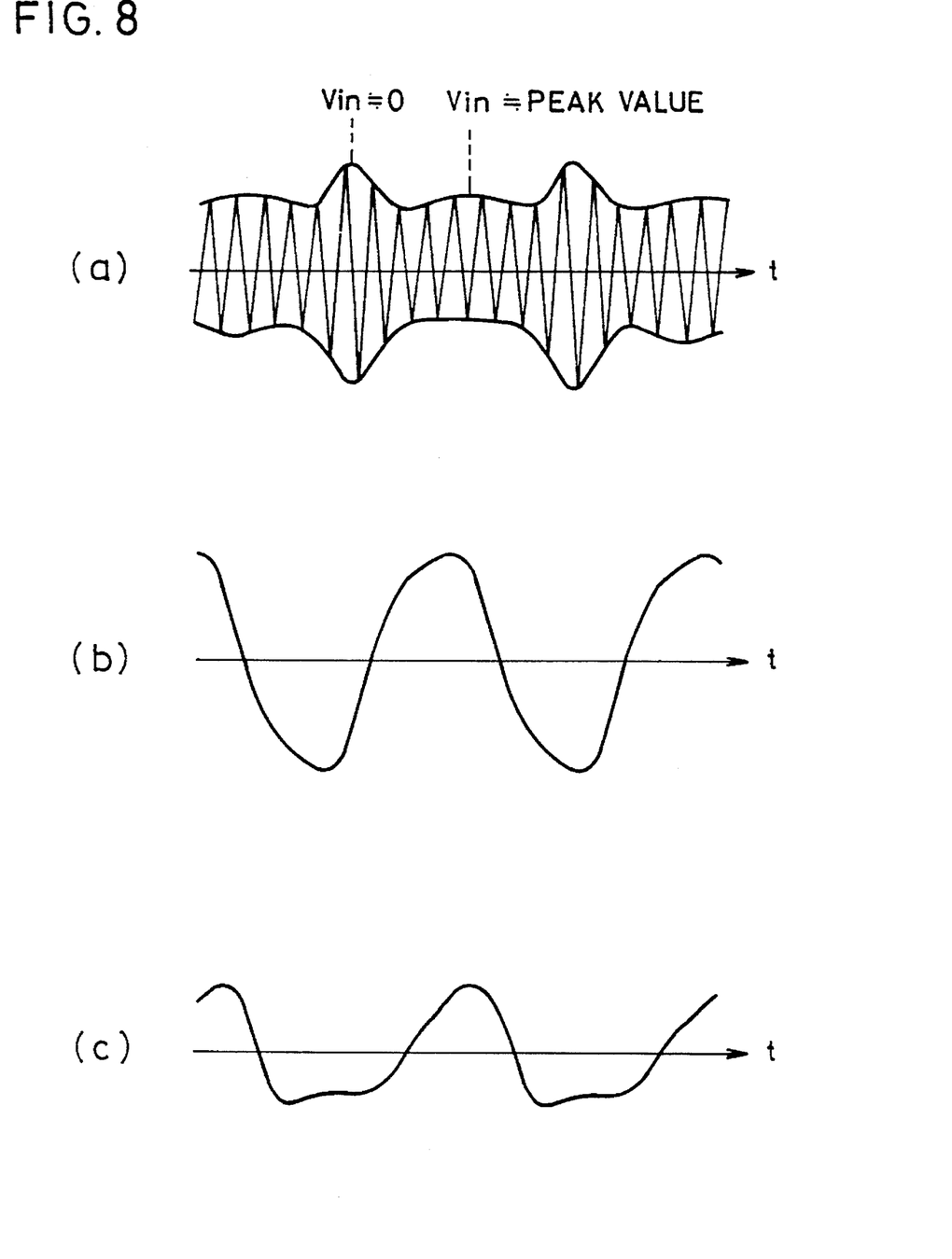
FIGS. 8(a) to 8(c) are waveform diagrams showing load currents in the devices of FIGS. 5 and 6.

In the embodiment of the inverter device as shown in FIG. 4, on the other hand, the inductor L2 is positively inserted in the inverter loop. That is, when the one switching element Q1 is ON, the discharge current of the DC power-source capacitor C1 flows through a path including the capacitor C1, discharging diode D4, one switching element Q1, resonating inductor L1, resonating capacitor C3, load U such as the discharge lamp as well as the resonating capacitor C2, inductor L2 and again the capacitor C1. When the other switching element Q2 is ON, on the other hand, the current flows through a path of the capacitor C3, inductor L1, the other switching element Q2, inductor L2, load U as well as capacitor C2 and again the capacitor C3, while the inductor L2 is forming part of the resonating circuit of the inverter. The direction of the current when the other switching element Q2 is ON is the same as that of the current flowing through the capacitor C4, that is, the current flowing through the path from the full-wave rectifier DB, capacitors C4 and C3, inductor L1, the other switching element Q2, inductor L2 and back to the rectifier DB, having the same oscillating direction as that of the oscillation of the inverter. As will be clear when such load-current waveforms of the inverter device of FIG. 4 as shown in FIG. 7 are referred to in comparison with such load-current waveforms of the inverter device of FIG. 6 as shown in FIG. 8, it will be appreciated that a remarkable improvement can be attained in respect of the asymmetricity between the positive and negative sides. In FIGS. 7 and 8, the waveform (a) is of the load current at the cycle of the commercial source current, the waveform (b) is of the load current as magnified when Vin=0 V, and the waveform (c) is of the load current as magnified when Vin=the peak value.

Figure 9:
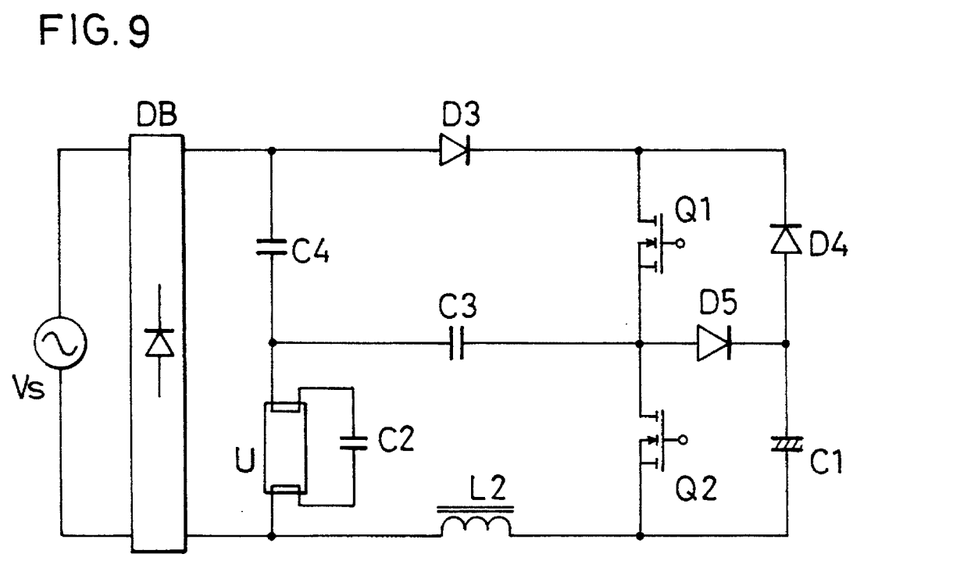
FIGS. 9 through 22 are circuit diagrams showing other embodiments of the inverter device according to the present invention.

In FIG. 9, still another embodiment of the inverter device according to the present invention is shown, in which the inductor L1 employed in the embodiment of FIG. 4 is omitted, and the other inductor L2 is employed for both functions as the inductance component and additionally as an oscillating element. According to this arrangement, this capability of reducing one inductor is effective to simplify the device arrangement and to minimize the manufacturing costs and dimensions of the device.

Figure 10:
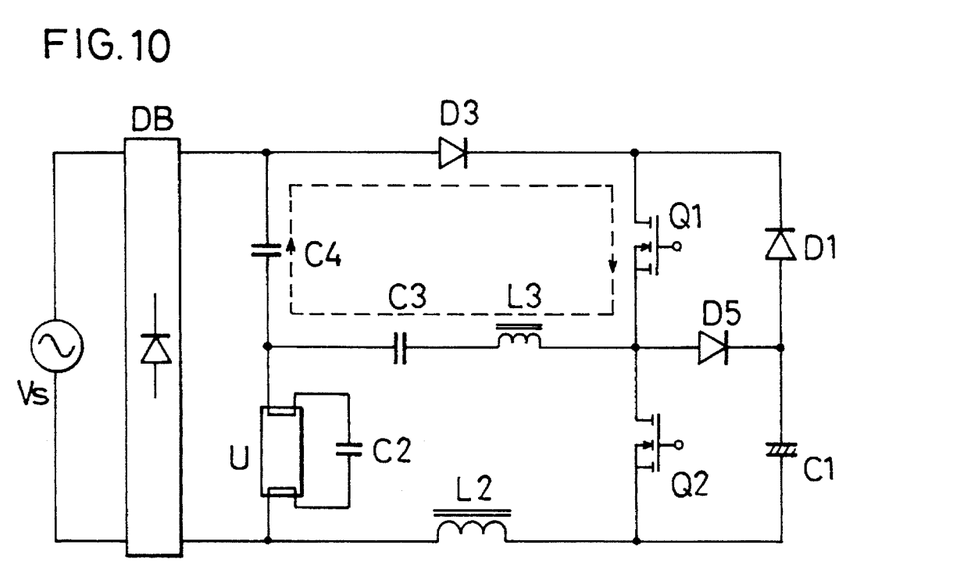

In another embodiment shown in FIG. 10 of the inverter device according to the present invention, an inductor L3 of a smaller inductance value than that of the inductor L1 employed in the embodiment of FIG. 4 is utilized positively. When in this case the current flows through such path of the capacitors C3 and C4, diode D3, one switching element Q1 and capacitor C3 as shown by a dotted line, in particular, an abrupt current is apt to flow so as to remove a potential difference between the capacitors C3 and C4, but this abrupt current can be well restrained with the inductance L3 even of a relatively small inductance value, so that an application of any stress upon the one switching element Q1 can be effectively avoided. In this instance, the inductor L3 can be minimized in size, and eventually the whole dimensions of the inverter device can be minimized.

Figure 11:
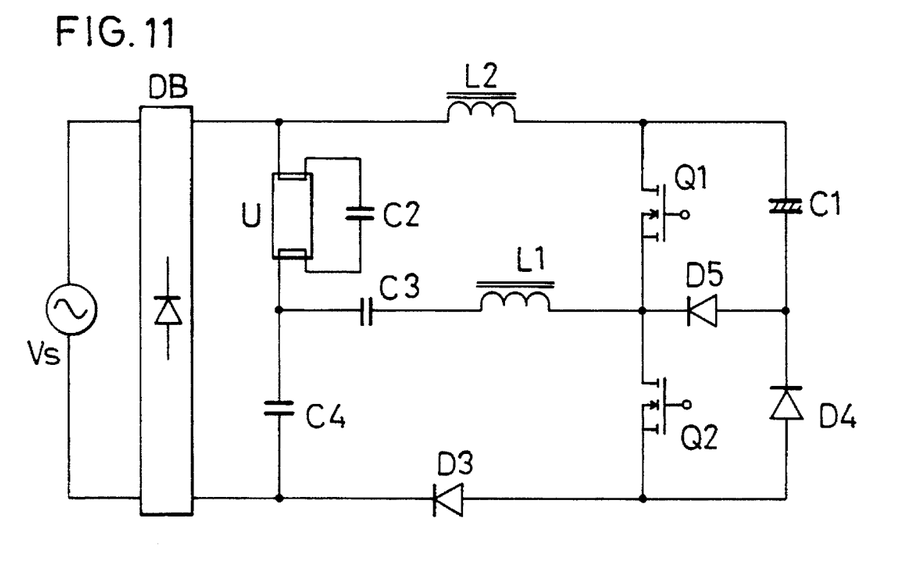

In another embodiment of the inverter device according to the present invention as shown in FIG. 11, the respective constituents for the inverter in the embodiment of FIG. 4 are disposed upside down with respect to the positive and negative side output ends of the full-wave rectifier DB, and the voltage dropping chopper also useful in substantially similar manner to the embodiment of FIG. 4 can be formed even with this arrangement.

Figure 12:
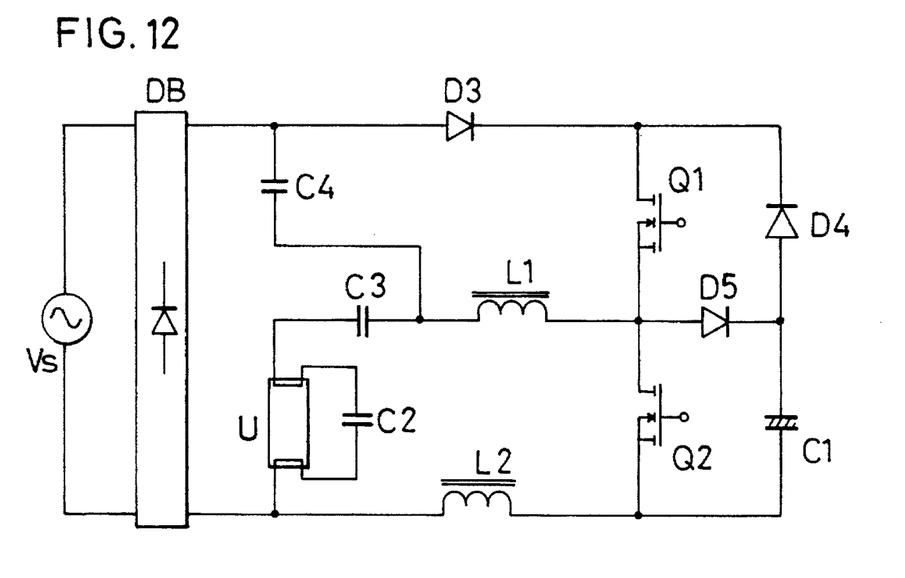

In FIG. 12 showing still another embodiment of the inverter device according to the present invention, connecting position of the impedance capacitor C4 in the embodiment of FIG. 4 is altered from the connecting point between the capacitor C3 as well as load U and the capacitor C2 to a connecting point between the capacitor C3 and the inductor L1, and the voltage dropping chopper useful substantially in similar manner to the embodiment of FIG. 4 can be formed even with this arrangement.

Figure 13:
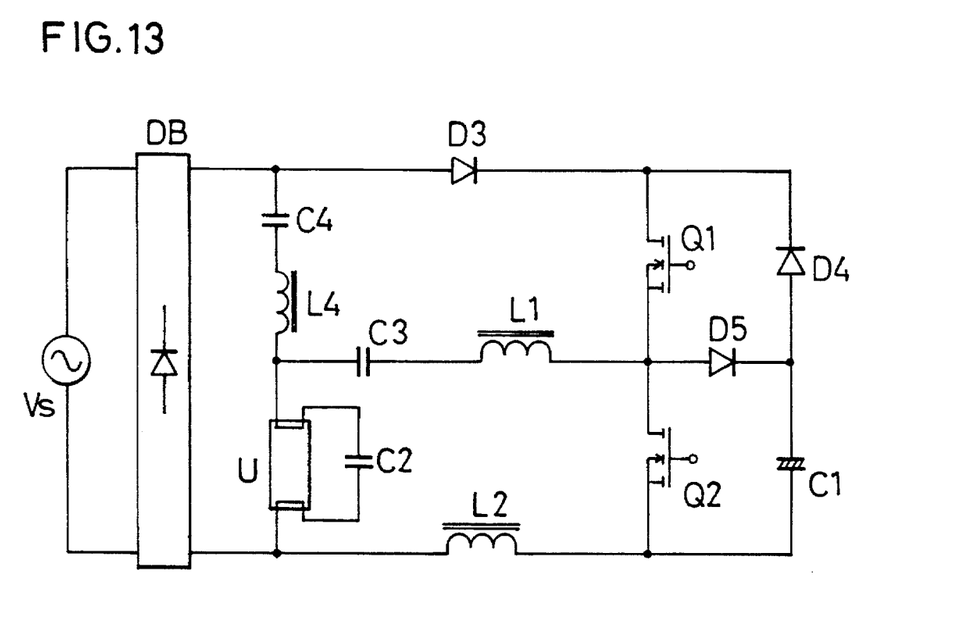

In FIG. 13 showing another embodiment of the inverter device according to the present invention, a further inductor L4 is connected with respect to the impedance capacitor C4 in the embodiment of FIG. 4, and this inductor L4 is connected to a connecting point between the resonating capacitor C3 and the load U and capacitor C2. With this arrangement, too, the voltage dropping chopper useful equally to or more than the embodiment of FIG. 4 can be formed. In the present instance, the inductor L1 inserted between the capacitor C3 and the connecting point between the pair of switching elements Q1 and Q2 may be omitted.

Figure 14:
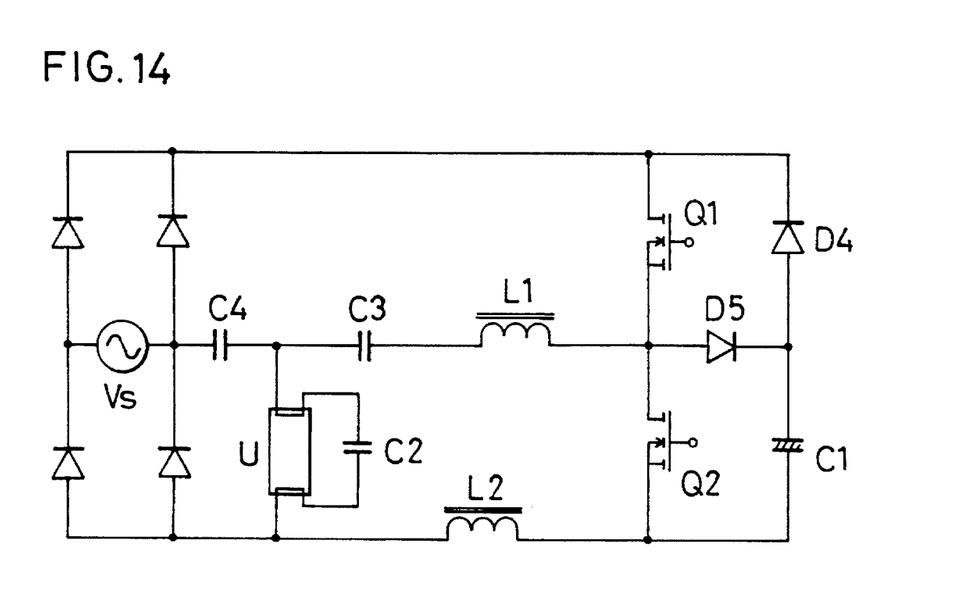

In another embodiment shown in FIG. 14 of the inverter device according to the present invention, the impedance capacitor C4 is connected at one end directly to the AC power source Vs, instead of the positive side output end of the full-wave rectifier DB in the embodiment of FIG. 4. According to this embodiment, an omission of the diode D3 does not cause any ripple component which giving undesirable influence to the operation to occur.

Figure 15:
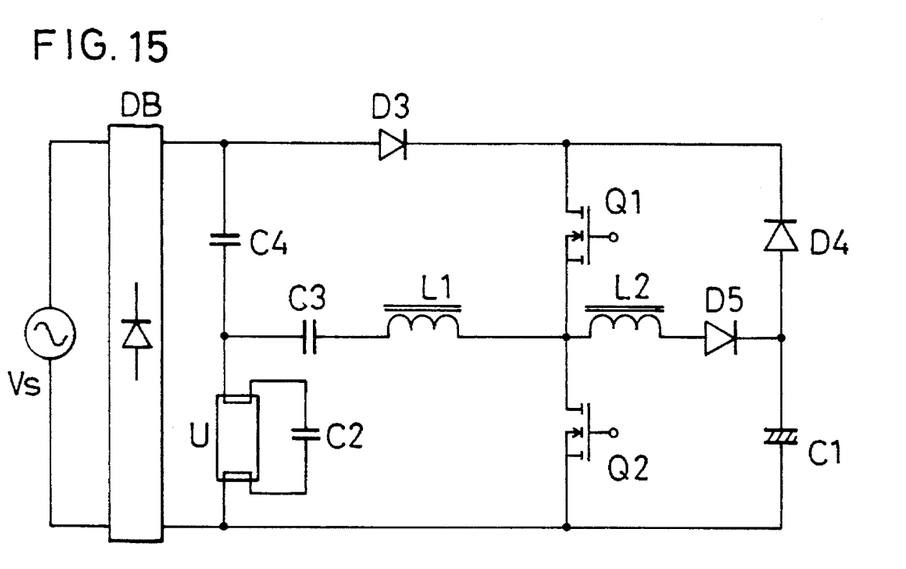
Figure 16:
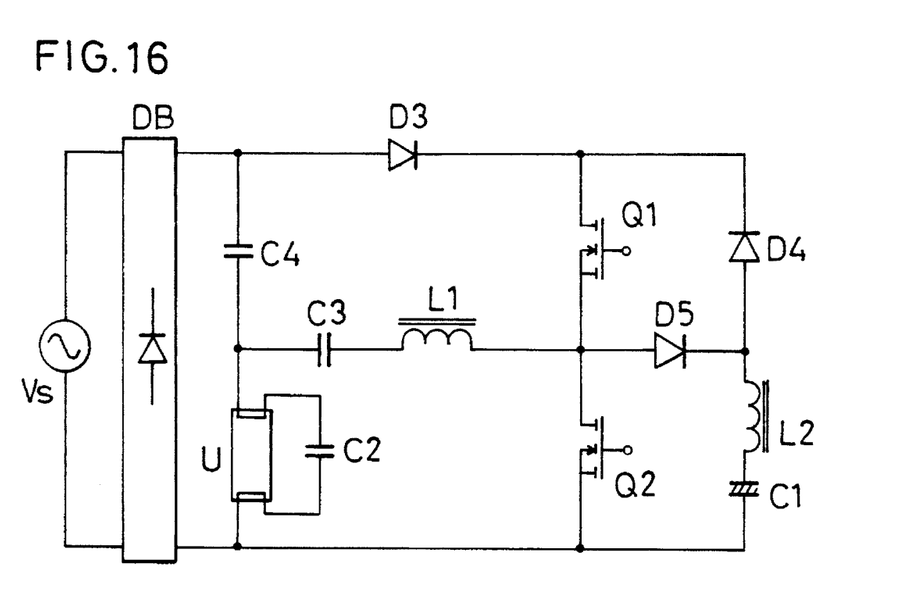

In another embodiment shown in FIG. 15 of the inverter device according to the present invention, the inductor L2 is connected between the connecting point of the pair of switching elements Q1 and Q2 and the charging diode D5. In still another embodiment shown in FIG. 16 of the inverter device according to the present invention, the inductor L2 is directly connected to the DC power-source capacitor C1, and the inductor L2 is connected to a connecting point between the discharging diode D4 and the charging diode D5. While in this embodiment of FIG. 16 the arrangement of the pair of switching elements Q1 and Q2, diodes D4 and D5, inductor L2 and DC power-source capacitor C1 is similar to a circuit shown in FIG. 17 of Japanese Patent Laid-Open Publication No. 59-220081, for example, the present embodiment is different in respect of the provision in the inverter of the impedance capacitor C4. In particular, the capacitor C4 acts to cause an input current to flow to part of the inverter, whereby a flow of regenerated current to the inverter causes the DC power-source capacitor C1 to be effectively charged and eventually a voltage boosting of the capacitor up to the peak value of the source voltage Vs can be attained. In this event, it will be appreciated that an undesirable charging of the DC power-source capacitor C1 through a path from the full-wave rectifier DB through the one switching element Q1 and inductor L2 can be prevented.

In the respective embodiments of FIGS. 3, 4 and 9 through 16, other constituents than those described in the above are the same as those in the foregoing embodiment of FIG. 2, and the same functions are attainable. In particular, the embodiments of FIGS. 9 to 16 are closely similar to the embodiment of FIG. 4 and are capable of minimizing the distortion of the input current and improving remarkably the input power factor. In the respective embodiments of FIGS. 2 to 4 and 9 to 16, too, the detecting circuit DET and control circuit CON described with reference to FIG. 1 may be provided.

Figure 17:
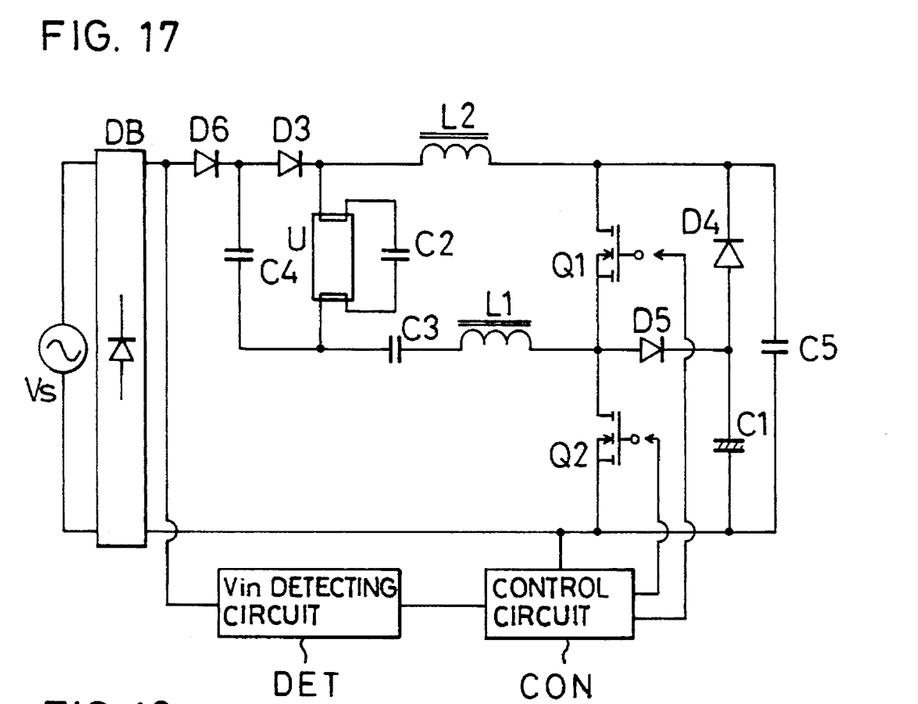

In FIG. 17, there is shown another embodiment of the inverter device according to the present invention, in which, in contrast to the embodiment of FIG. 3, for example, such load U as a discharge lamp and the oscillating capacitor C2 are connected to the positive side output end of the full-wave rectifier DB. More specifically, the diode D3 is connected through a diode D6 to the positive side output end of the full-wave rectifier DB, and the inductor L2 is connected to the diode D3. To a connecting point between the diodes D3 and D6, the impedance capacitor C4 is connected while the load U and oscillating capacitor C2 are connected at their one end to a connecting point between the diode D3 and the inductor L2, and the capacitor C3 is connected to a connecting point between the capacitor C4 and the other ends of the load U and capacitor C2. With this arrangement, in addition to an improvement in the asymmetricity of the load current, it is made easier to detect an input voltage to the detecting circuit DET. That is, as a control output of the control circuit CON is provided to a source electrode of such other switching element Q2 as MOSFET, the input voltage can be easily detected with a detection of a potential at the positive side output end of the full-wave rectifier DB. Accordingly, it is made possible to effectively restrain the ripple in the load current, in accordance with the magnitude of the input voltage. The diode D6 directly connected to the positive side output end of the full-wave rectifier DB is provided for preventing the operation from being made unstable by a high frequency oscillation voltage of the inverter applied through the full-wave rectifier to the source side, and a use of high speed type diode as this diode D6 will allow an inexpensive rectifier for a low frequency use to be employable as the full-wave rectifier DB.

Figure 18:
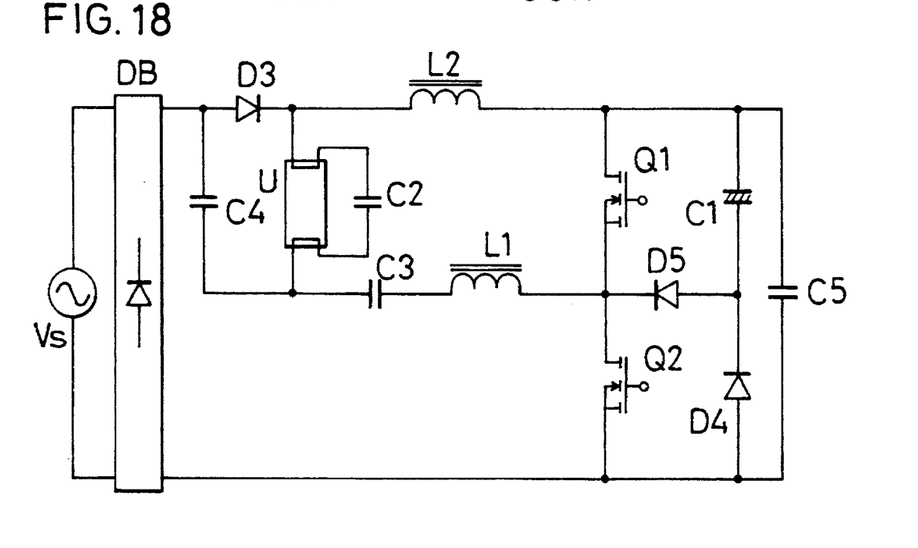

In another embodiment shown in FIG. 18 of the inverter device according to the present invention, the diode D6 connected to the positive side output end of the full-wave rectifier DB in the embodiment of FIG. 17 is omitted, and the diode D4 and capacitor C1 connected in parallel with respect to the pair of switching elements Q1 and Q2 are disposed to be in parallel with respect to the positive side or negative side of the full-wave rectifier DB. Further, accompanying the change in the connection of the diode D4 and capacitor C1, the diode D5 is also disposed to be in a direction reverse to that in the embodiment of FIG. 3. In this case, the function of the voltage dropping chopper can be attained by the other one Q2 of the pair of switching elements.

Figure 19:
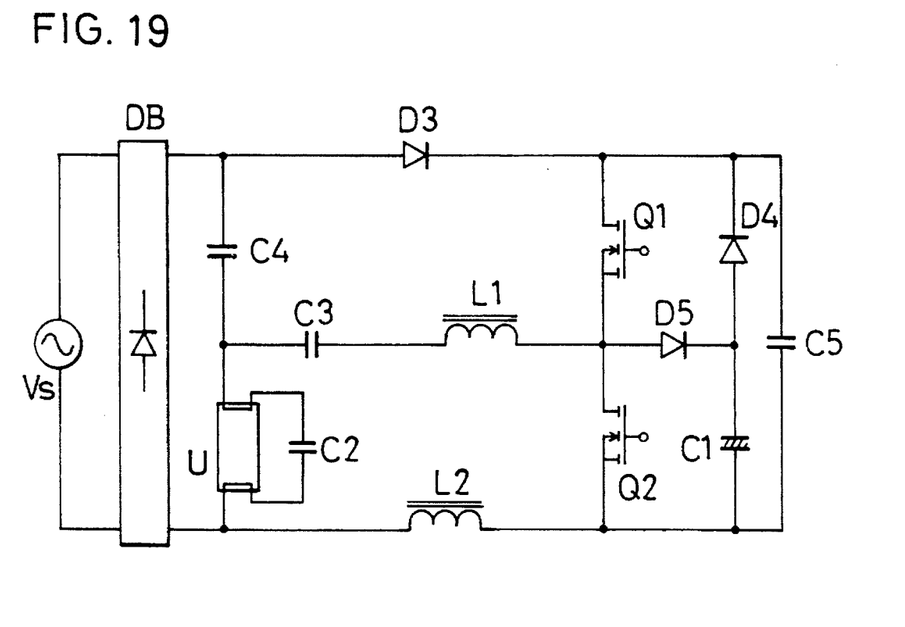

In another embodiment shown in FIG. 19 of the inverter device according to the present invention, in contrast to the embodiment of FIG. 4, the capacitor C5 is connected in parallel to the series circuit of the discharging diode D4 and DC power-source capacitor C1, whereby any stress apt to be applied to the series circuit upon turning OFF of the switching elements Q1 and Q2 as has been described with reference to FIG. 3 can be absorbed. In this case, the capacitor C5 can be considerably smaller in the capacity than the DC power source capacitor C1.

Figure 20:
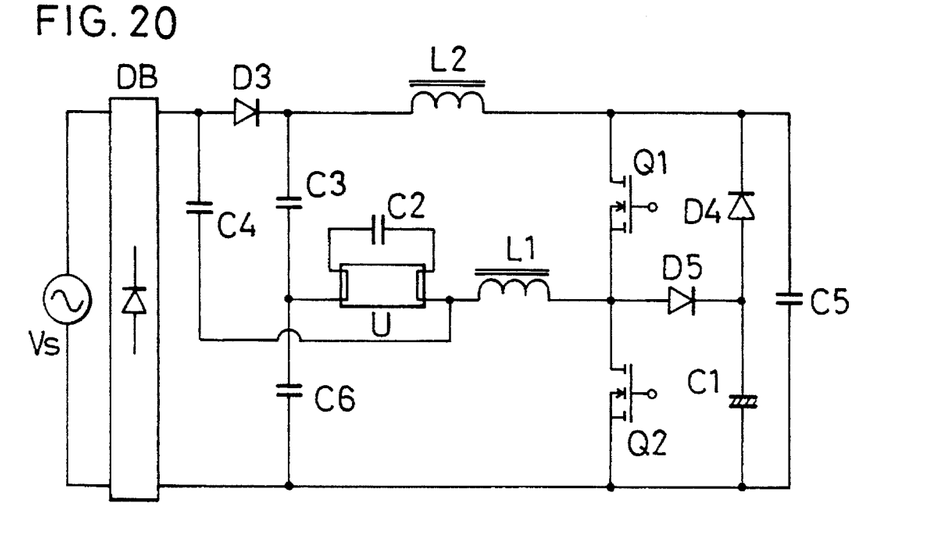

In still another embodiment shown in FIG. 20 of the inverter device according to the present invention, in contrast to the embodiment of FIG. 18, for example, the load U and capacitor C2 and the capacitor C3 are mutually replaced by one another, and the impedance capacitor C4 is connected at one end to, instead of the connecting point between the load U and capacitor C2 and the capacitor C3, a connecting point between the load U and capacitor C2 and the inductor L1. Further, the capacitor C3 is connected to the load U and capacitor C2 and also to a further capacitor C6, as inserted between both positive and negative side output lines. In this case, the prevention of the stress application upon turning OFF of the switching elements Q1 and Q2 can be performed even in the absence of the capacitor C5.

Figure 21:
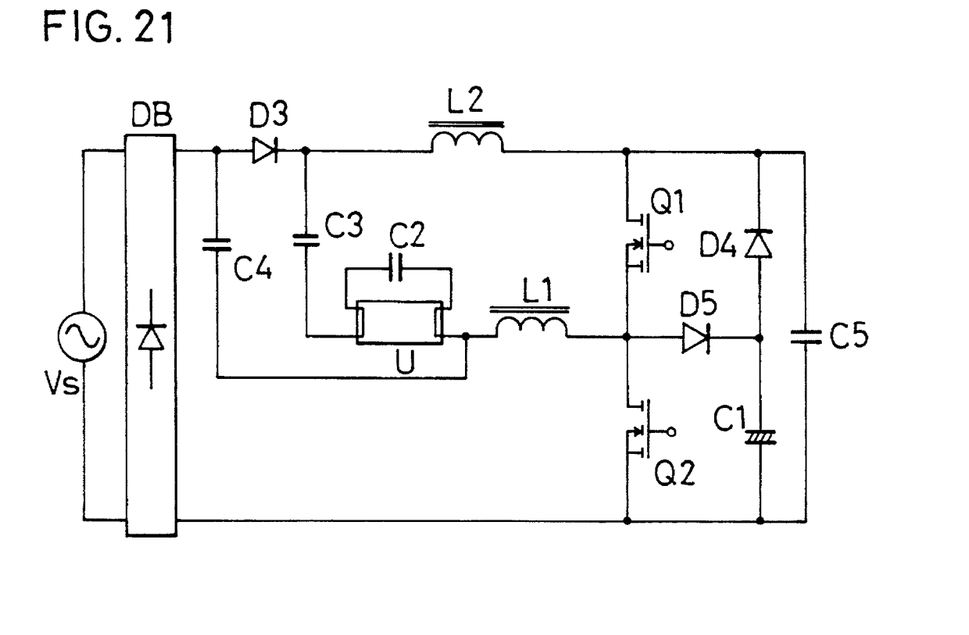

In another embodiment shown in FIG. 21 of the inverter device according to the present invention, the capacitor added in the embodiment of FIG. 20 is omitted.

Figure 22:
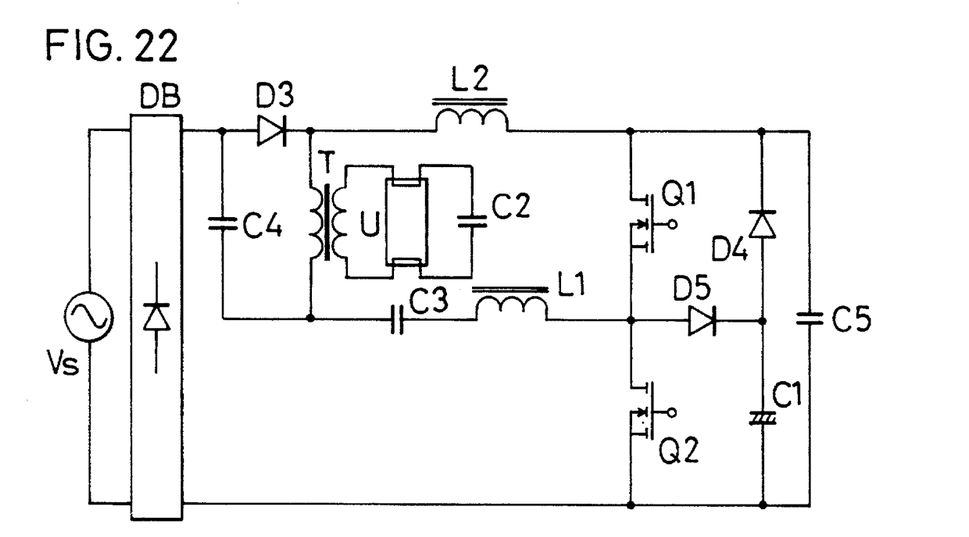

In a further embodiment shown in FIG. 22 of the inverter device according to the present invention, a transformer T is provided in place of the capacitor C3 in the embodiment of FIG. 21, while the capacitor C3 itself is connected in series between the capacitor C4 and the inductor L1. Further, such load U as the discharge lamp as well as the capacitor C2 are connected to secondary side coil of the transformer T, while the capacitor C2 may be connected to a primary side coil of the transformer T. The primary side coil of the transformer T is connected at one end to a connecting point between the capacitors C3 and C4.

In the respective embodiments shown in FIGS. 17 to 22, other constituents than those described are the same as those in the foregoing embodiments of FIGS. 2 and 4, and the same functions are established. In the embodiments of FIGS. 18 to 22, the detecting circuit DET and control circuit CON are also provided in the same manner as in the embodiment of FIG. 17.

What is claimed is:

1. An inverter device comprising an AC power source, a full-wave rectifier for full-wave rectifying an AC input voltage from said AC power source, an inverter connected to output ends of said full-wave rectifier and including a load circuit having an LC resonance series, and a DC power-source capacitor for supplying a DC power to said inverter;

said inverter including a pair of switching elements for controlling charging and discharging of said DC power-source capacitor, a charging diode for causing a charge current to flow to said DC power-source capacitor upon regeneration of a power at the inverter, a discharging diode for causing a DC current to flow from said DC power-source capacitor to the inverter, an impedance element connected between said output ends of said full-wave rectifier and part of said load circuit in the inverter, and an inductance component provided in a loop for charging said DC power-source capacitor from said AC power source through said full-wave rectifier and one of said pair of switching elements in the inverter.

2. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a load circuit and connected across both ends of said second switching element Q2;

a third capacitor C4 connected through said load circuit across both of said output ends of said rectifier DB; and an inductance component inserted in a loop for charging said first capacitor C1 from said AC power source through said rectifier DB and first switching element Q1.

3. The inverter device according to claim 2, wherein said inductance component is connected between said second switching element Q2 and a negative side one of said output ends of said rectifier DB.

4. The inverter device according to claim 3, wherein said inductance component is employed also as a resonating inductance.

5. The inverter device according to claim 3, wherein a fourth capacitor C2 is connected at an end to an end of said AC power source.

6. The inverter device according to claim 2, wherein said inductance component is connected between a positive side one of said output ends of said rectifier DB and a connecting point of said first diode D3 and third capacitor C4.

7. The inverter device according to claim 2, wherein said inductance component is connected between said AC power source and an AC power source side input end of said rectifier DB.

8. The inverter device according to claim 2, wherein said inductance component is connected between a connecting point of a positive side one of said output ends of said rectifier DB to said third capacitor C4 and said first diode D3.

9. The inverter device according to claim 2, wherein said inductance component is connected in series with said first capacitor C1 to be between a cathode side of said third diode D5 connected to a positive side output ends of said second switching element Q2 and a negative side output end of the second switching element Q2.

10. The inverter device according to claim 2, wherein said inductance component is connected in series with said third diode to be between a positive side of said second switching element Q2 and said first capacitor C1.

11. The inverter device according to claim 2, wherein said third capacitor C4 comprises an impedance including a capacitor.

12. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a discharge lamp and connected across both ends of said second switching element Q2;

a third capacitor C4 connected through said discharge lamp across both of said output ends of said rectifier DB;

a fourth capacitor C2 connected through said discharge lamp across both non-source side terminals of said discharge lamp; and an inductance component inserted in a loop for charging said first capacitor C1 from said AC power source through said rectifier DB and first switching element Q1.

13. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a load circuit and connected across both ends of said first switching element Q1;

a third capacitor C4 connected through said load circuit across both output ends of said rectifier DB; and an inductance component inserted in a loop for charging said first capacitor C1 from said AC power source through said rectifier DB and second switching element Q2.

14. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a discharge lamp and connected across both ends of said first switching element Q1;

a third capacitor C4 connected through said discharge lamp across both output ends of said rectifier DB;

a fourth capacitor C2 connected through said discharge lamp across both non-source side terminals of said discharge lamp; and an inductance component inserted in a loop for charging said first capacitor C1 from said AC power source through said rectifier DB and second switching element Q1.

15. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a discharge lamp and connected across both ends of said first switching element Q1;

a third capacitor C4 connected between one of said output ends of said rectifier DB and said discharge lamp connected to said first, forward diode D3;

a fourth capacitor C2 connected through said discharge lamp across both non-source side terminals of said discharge lamp; and an inductance component inserted in a loop for charging said first capacitor C1 from said AC power source through said rectifier DB and second switching element Q2.

16. The inverter device according to claim 15, wherein said inductance component is connected between said first switching element Q1 and said discharge lamp.

17. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a load circuit and connected across both ends of said first switching element Q1;

a third capacitor C4 connected between one of said output ends of said rectifier DB and said load circuit connected to said first, forward diode D3; and an inductance component inserted in a loop for charging said first capacitor C1 from said AC power source through said rectifier DB and first switching element Q1.

18. The inverter device according to claim 17, wherein said inductance component is connected between said first switching element Q1 and said load circuit.

19. The inverter device according to claim 17, wherein said load circuit is provided with a transformer connected to said discharge lamp in its secondary side coil, and fourth capacitor C2 is connected between non-source side terminals of said discharge lamp.

20. The inverter device according to claim 17, wherein sixth diode D6 is connected between one of said output ends of said rectifier DB and a connecting point of said first diode D3 and said third capacitor C4.

21. An inverter device comprising:

an AC power source;

a full-wave rectifier DB for full-wave rectifying an AC input voltage from said AC power source;

a series circuit, connected through a first, forward diode D3 across both output ends of said rectifier DB, of a second, backward diode D4 and a first capacitor C1;

a series circuit, connected through said first, forward diode D3 across both of said output ends of said rectifier DB, of first switching element Q1 and second switching element Q2;

a third, forward diode D5 connected between a connecting point of said first and second switching elements Q1 and Q2 and said first capacitor C1;

a series circuit of an inductor L1, second capacitor C3 and a discharge lamp and connected across both ends of said first switching element Q1;

a third capacitor C4 connected between one of said output ends of said rectifier DB and the series circuit of said second capacitor C3 and said discharge lamp connected to said first, forward diode D3;

a fourth capacitor C2 connected through said discharge lamp across both non-source side terminals of said discharge lamp; and an inductance component inserted in a loop for charging said first capacitor C1 from said AC power source through said rectifier DB and first switching element Q1.

22. The inverter device according to claim 21, wherein said inductance component is connected between said first switching element Q1 and said discharge lamp.

23. The inverter device according to claim 21, wherein sixth capacitor C6 is connected across both of said output ends of said rectifier DB through said first diode D3 and said second capacitor C3.

* * * * *

UNITED STATES PATENT AND TRADEMARK OFFICE
CERTIFICATE OF CORRECTION

PATENT NO. : 5,517,403
DATED : May 14, 1996
INVENTOR(S) : Maehara

It is certified that error appears in the above-indentified patent and that said Letters Patent is hereby corrected as shown below:

Column 10, Line 36, change "Q1" to --Q2--.

Signed and Sealed this

Twenty-third Day of July, 1996

Attest:

BRUCE LEHMAN

*Attesting Officer*     *Commissioner of Patents and Trademarks*